United States Patent
Mähner

(10) Patent No.: US 6,674,531 B2
(45) Date of Patent: Jan. 6, 2004

(54) METHOD AND APPARATUS FOR TESTING OBJECTS

(76) Inventor: Bernward Mähner, Auenstrasse 3a, D-82275 Emmering (DE)

( * ) Notice: Subject to any disclaimer, the term of this patent is extended or adjusted under 35 U.S.C. 154(b) by 203 days.

(21) Appl. No.: 09/931,183

(22) Filed: Aug. 17, 2001

(65) Prior Publication Data

US 2003/0038945 A1 Feb. 27, 2003

(51) Int. Cl.⁷ .............................. G01B 9/02; G01L 1/24
(52) U.S. Cl. ...................... 356/457; 356/458; 356/35.5
(58) Field of Search ............................... 356/457, 458, 356/35.5, 520, 521

(56) References Cited

U.S. PATENT DOCUMENTS 5,786,533 A * 7/1998 Newman .................... 73/146
6,219,143 B1 * 4/2001 Lindsay et al. ............. 356/458

FOREIGN PATENT DOCUMENTS

| DE | 42 31 578 | 3/1994 |
| DE | 195 09 962 | 9/1996 |
| DE | 100 09 870 | 9/2001 |
| EP | 1 061 332 | 12/2000 |

* cited by examiner

Primary Examiner—Samuel A. Turner
Assistant Examiner—Patrick Connolly
(74) Attorney, Agent, or Firm—Venable LLP; Stuart I. Smith

(57) ABSTRACT

With interferometric test systems, the test object is frequently measured over several sections in order to realize a complete test. If special structural features are found, in particular defects, it is usually difficult to localize the structural features shown on the result images on the object. It is the object of the present method to transfer the interferometrically measured data from the various sections to a joint object coordinate system. To achieve this object, the shape of the object is measured and the spatial coordinates for the deformation data on the object surface are determined from this measured. Thus, a method is realized which permits determining the exact spatial orientation and position of the discovered structural features on the object. On the one hand, the defects on the object can thus be localized precisely while, on the other hand, an exact quantitative evaluation of the results is possible.

33 Claims, 7 Drawing Sheets sector 1 sector 2 sector 1 + sector 2

S1N1

S2N1

S1N2

S2N2

S1N1 + S2N1 + S1N2 + S2N2

METHOD AND APPARATUS FOR TESTING OBJECTS

BACKGROUND OF THE INVENTION

The option of using interferometric methods, such as the ESPI (electronic speckle pattern interferometry) or the shearing technique for determining areas of displacement or expansion on a test object with diffuse scattering surface is known. The desired result and the required resolution or rigidity of the text object relative to the magnitude of the applied forces determine which method can be used for a given test object. However, all test methods for determining specific areas have in common that a camera is used for imaging the object on an image sensor. Regardless of the measuring principle used, these camera-based methods consequently produce results in the form of images. If a CCD chip is used as image sensor, then the generated (resulting) images consist of an endless number of image points or pixels. The images from the test system camera and, in the final analysis, the intensity values stored in the individual image points represent the starting data for any further processing of the measuring results. Digital image processing systems are used almost without exception for the continued processing of the measuring results. With the above-mentioned test methods, two test object states are normally compared during the static test by taking pictures of the object in two different conditions of stress and by subtracting the interferograms of the two states. As a result, a difference interferogram is obtained, which represents either the displacement or the expansion of the object between the two states in the form of interference lines, depending on the measuring principle used. The amount of the displacement or expansion at one image point of the difference interferogram in that case can be determined by counting the interference lines, starting with one image point with known displacement or expansion and taking into consideration the light wavelength used. If the measuring head is equipped with a phase displacement unit, an additional evaluation based on the principle of the phase-shifting technique can be carried out (W. Osten, "DIGITALE VER-ARBEITUNG UND AUSWERTUNG VON INTERFERENZ-BILDERN" [Digital Processing and Evaluation of Interference Images], Chapter 6, Akademie Verlag [Publishing House] ISBN 3-05-501294-1). In the process, images are created that assign a specific phase angle to each image point. If the phase images are subtracted from two states of the object, a phase difference image is obtained. In contrast to the above-mentioned difference interferogram, the phase difference image does not show sine-shaped modulated interference lines, but shows directly the phase difference angle between the second and the first state. Another advantage of this representation is that owing to the computing rules used for the phase shifting technique, the phase angle is standardized, meaning the gray value that corresponds in a phase image with a phase angle is always constant, regardless of the image coordinate.

Depending on the shape and size of the test object, the interferometric measurement frequently must be taken successively or simultaneously over several sections. To be sure, the camera of the measuring system cannot detect and subsequently evaluate more than the camera can see of the test object in its actual position and in one view. In order to detect the test object completely, the test object must therefore be photographed from several different positions, wherein this action can occur parallel if several measuring heads are used simultaneously. The interferometric testing of tires, for example, represents a typical use of this type is. Thus, German Patent 42 31 578 C2 describes a method for detecting deformations on test objects, wherein the exemplary embodiment shows that a sector-by-sector testing of tires in particular was considered. U.S. Pat. No. 5,786,533 suggests a method for the purposeful localization of defects in tires, in particular in the belt area. In this case as well, the arrangement of the illustrated measuring head and test object permits an evaluation of the total belt region only if the testing occurs over several sectors. With the above-mentioned exemplary embodiments, a search is typically conducted for structural defects located under the surface, which cannot be detected from the outside. The camera of the interferometric measuring head delivers perspective images of the objects, which additionally show this object more or less distorted, depending on the projection lens used. If the defects displayed in the result images are to be localized on the test object, problems arise because the resulting image of the object is shown geometrically distorted and an exact coordination of image position and object coordinates is therefore not possible. If the defect is not visible from the outside and if the images otherwise do not contain visible features such as marks, edges, and the like that would characterize its position on or in the test object, then only a rough guess of its true position is possible with the aid of result images. A further difficulty is the unknown orientation of the result images from different surface sections, relative to each other, if the test object is measured section-by-section. The images of different surface sections in that case will overlap more or less or there will be gaps of an unknown size. A quantitative, computer-supported evaluation of the results is consequently more difficult, e.g. because an exact determination of the area of the detected defects is not possible. For example, if the overlapping areas are not determined, then defects located in these areas are counted several times and incorrect results are obtained. Thus, it is frequently requested that all measured sections of the surface be displayed in a joint coordinate system. Frequently, marks or numbered lines, visible on the camera images, are simply painted onto the test object as auxiliary aids. However, this course of action is very involved because the marks must be applied anew to each test object and may have to be removed following the measuring operation. It is also possible to use the edges of objects in the video image for the orientation and then attempt to rectify the images interactively via suitable image processing functions. This course of action, however, cannot be used with an automatic test run and without specially trained personnel. A method is described, among other things, in patent WO 97/05449 A1, for which the three-dimensional surface contour of an object is measured in sections. A surface model of the object is generated from the contour data. The measuring head for the three-dimensional detection of the object surface additionally comprises a device for detecting the color information on the object surface. By means of a so-called texture-mapping technique, the obtained color information is transferred point-by-point or section-by-section onto the generated surface model. Finally, a surface model is obtained that not only displays the shape of the object, but also its coloration true to the original.

SUMMARY OF THE INVENTION

Starting with this prior art, it is the object of the invention to provide a method and a device for exactly determining the spatial position of the interferometrically obtained measured values on the object and for spatially coordinating the individual interferometrically measured surface sections relative to each other. The process should run down automatically and should not require interactive steps by the user. Furthermore, the method should make it possible to transfer the interferometric measuring results to a joint coordinate system.

The above object generally achieved according to a first aspect of the invention by a method for testing the deformation of test objects with diffuse scattering surface that are subjected to different stresses, for which method the object surface is tested section-by-section with an interferometric measuring head with a camera that uses an interferometric technique for measuring an area, the areas of displacement or expansion on the object surface, caused by different stresses, are detected in the lest object images on the image sensor of the camera, the images created on the image sensor are fed to an image processing system for the further processing, the displacement or the stress/expansion condition of the test object is computed from the generated images by the image processing system, wherein:

- the optical ray path of the camera for the interferometric measuring head is determined through a calibration;
- the camera for the interferometric measuring head is moved with a defined relative movement to the test object from one section of the object surface to the next;
- light sections are generated on the interferometrically measured sections of the test object surface;
- the generated light sections on the object surface are detected with the aid of a camera;
- the spatial coordinates of the light sections are computed with a triangulation computation;
- the spatial coordinates of the surface sections are determined from the spatial coordinates of the light sections; and
- the appropriate spatial coordinates are assigned to the interferometrically detected deformation data with the aid of the obtained spatial coordinates for the surface sections and the data for the relative movements performed by the interferometric measuring head.

The above object generally is achieved according to a second aspect of the invention by an apparatus for testing objects with diffuse scattering surface, comprising an interferometric measuring head with a camera for photographing image data, and an image processing system that is connected to the camera and is used to further process the images generated by the camera; and wherein:

- the test system is provided with at least one device for realizing defined relative movements between the interferometric test head and the object surface;
- the test system is provided with a light-section contour detection system, comprising at least one device for generating light surfaces, which are oriented toward the camera such that the light sections created by this device can be observed with the camera on the test object, means for determining the spatial coordinates of the light sections, means for determining from this the spatial coordinates for the object surface sections, and means for assigning appropriate spatial coordinates to the interferometrically detected deformation data.

Advantageous modifications are provided. According to the invention, the optical ray path of the camera for the interferometric measuring head is determined through a calibration, so that in particular location and direction of all observation rays starting from optional image points of the camera are known with respect to the camera.

According to the invention, a defined movement of the interferometric measuring head, relative to the test object, occurs from one interferometrically measured surface section to the next. That is to say, the direction and amount of this movement can be determined for each detected section, relative to the test object and the preceding position of the measuring head. These movements can involve very different rotational or linear movements or combinations thereof. The goal of these movements is the measuring of as many different sections of the test object as possible with the interferometric measuring head, so that finally the complete region of interest on the test object is detected without gaps. The location and direction of the observation rays for each surface section to be measured are known not only with respect to the camera, but also to a joint locally fixed coordinate system for the test object as a result of the defined movements of the measuring head and the calibration data for the interferometer camera.

Missing, however, are the spatial coordinates for the test object surface points imaged on the image sensor of the camera, which are needed for assigning the interferometrically detected deformation data to the object coordinates. As a result of the Currently indicated process steps, the location and direction of the observation rays that intersect with the object surface are known, but the distances between the imaged surface points to the camera are missing.

According to the invention, the surface sections to be examined interferometrically are therefore measured three-dimensionally by means of projected light sections, which are detected with a camera. For many applications, it is therefore advantageous if the surface contour is also detected section-by-section. Since the invention also uses a camera with flat image sensor for these three-dimensional contour measuring techniques, exactly the same problems are encountered with respect to the complete detection of the three-dimensional shape of the test object, as are encountered when taking measurements with an interferometric measuring system using a camera.

According to one advantageous embodiment of the invention, the light surfaces for generating the light sections consist of level surfaces, which respectively form a line-shaped light section on the object. However, points, circular surfaces or other illuminated marks can also be projected onto the object to obtain triangulation marks. To be sure, the interferometric measuring systems for detecting the contour can consist of totally separate devices. However, for cost reasons this is a disadvantage hardly countered by any advantages.

Thus, it is advantageous if the interferometric measuring system and the contour measuring system are rigidly joined and are moved by one and the same device, relative to the test object.

The camera for detecting the light sections and the camera in the interferometric measuring head furthermore are preferably identical, meaning the same camera is preferably used. The required image processing systems used to evaluate the interferometric image data as well as the light section images preferably form a single image processing system, even if completely different evaluation methods are used for computing the deformation and the shape from interferometrically obtained measuring data.

According to one advantageous embodiment, the method can be realized easily if the contour is detected with the aid of projected fringes, provided the coordinates are measured at the exact locations where the interferometric measurements are also carried out and if the same camera is used for detecting the images of the interferometric measurement and the contour measurement. In that case, the spatial coordinates and the deformation data for the exact same imaged object points are obtained, so that the assignment of spatial coordinates to deformation values and vice versa is unimportant. However, the use of a shearing module as imaging optics for the camera can present problems in that case. The shearing module generates a double image on the image sensor, wherein the individual images are displaced to the side, relative to each other. This effect, desired for the shearing measuring technology, creates problems when imaging the line pattern for the contour detection. A double image of the line pattern is also created and a clean distinction cannot be made. It is useful in that case to either orient the lines in the projection grid parallel to the shearing direction of the shearing module, or to use a separate camera for the contour detection system, e.g. a camera that is arranged immediately next to the one for the interferometer.

Another advantageous embodiment of the invention is the use of individual light surfaces, for example two light section planes that are generated with a laser scanner. Since only two light sections for one position can be evaluated in that case, the light sections preferably are photographed by the camera and are fed to the image processing system while the contour detection system moves from one surface section to the next. Numerous and different light sections and thus object sections are generated in this way if the movement speed relative to the image frequency of the camera is not too high. In order to prevent the individual images from becoming blurry as a result of the movement of the camera for the contour detection system, relative to the object, this camera is advantageously provided with a mechanical or electronic shutter. Of course, the movement from one section to the next can alternatively occur during several individual steps, but the complete movement will then take considerably longer. According to another aspect of the invention, the momentary position of the measuring head relative to the test object is simultaneously determined for each image taken of the light sections. In the final analysis, the spatial position of all photographed light sections can be determined unambiguously within a joint coordinate system. This embodiment has several important advantages: The equipment expenditure for realizing a contour detection in addition to the interferometric measurement is comparably low and requires only a device for generating the light sections. Furthermore, the contour detection does not require additional time since it can be realized while the measuring head moves from one section to the next. The most important advantage, however, is that the generated light sections can be identified and evaluated clearly, even if the imaging optics of the camera that detects the light sections contains a shearing module, as is the case for one aspect of the invention. To be sure, each light section is then imaged as a double line, but an averaging between these two lines is possible without problem.

The laser light sources always required for illuminating the test object for the interferometric measurement in principle represent interfering light sources during the contour detection. However, the light intensity of the light sections is advantageously selected high enough, so that the light from these laser light sources is not less important than that from the light sections. The laser light sources should not be switched during the contour measurement because many laser light sources have a tendency to mode jumps right after they are switched on. If laser diodes or similar, space-saving light sources are used, then these laser light sources are advantageously integrated securely into the interferometric measuring head.

For the section-by-section testing of an object, it is necessary to fix the position of the individual sections to be measured, the distance between measuring head and test object, as well as the number of sections to be measured, which are required for a complete detection of the surface to be examined. Fixing these positions will then lead to test machine parameters, e.g. the stepping motor position and the axis position, the number of sectors, etc. According to another aspect of the invention, the contour measuring system is additionally used to determine these parameters as well. The data supplied by the contour measuring system in that case can either permit a desired/actual value comparison of the measuring head position for the operator, or the data can be used for the fully automatic positioning of the measuring head.

An exemplary embodiment of the invention is explained in the following with the aid of drawings.

BRIEF DESCRIPTION OF THE DRAWINGS

FIG. 1b is a perspective view of the testing system shown in FIG. 1a.

DETAILED DESCRIPTION OF THE INVENTION

Figure 1A:
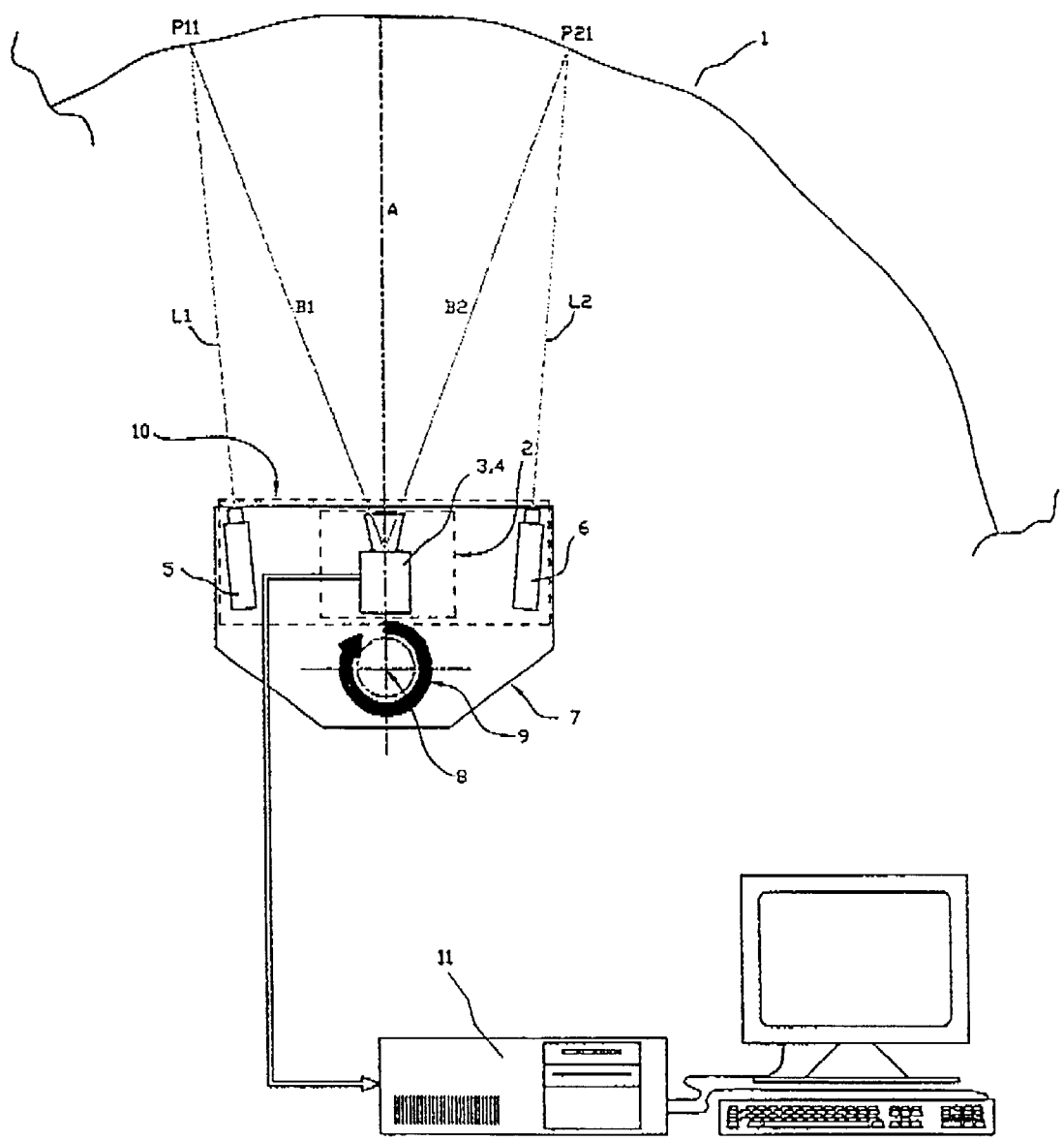
FIG. 1a shows a testing system for the section-by-section interferometric measuring of objects; shown in a view from above.
Figure 1B:
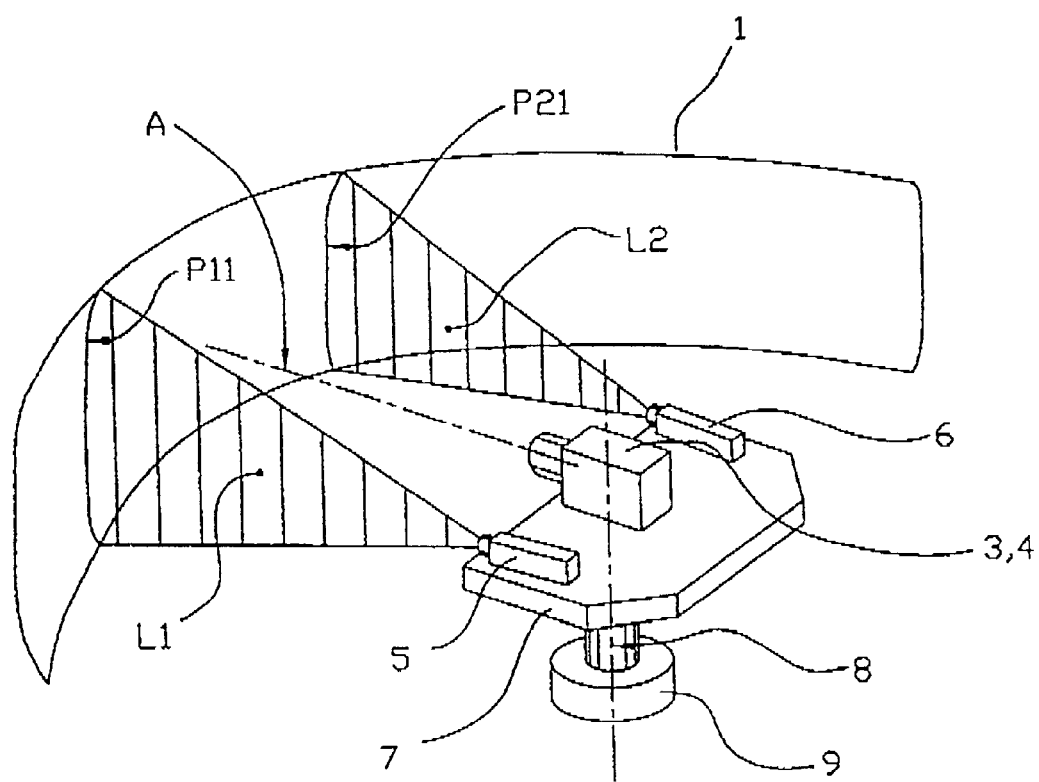

FIGS. 1a and 1b contain a view from above of a system for testing cylindrical objects, e.g. the belt of a vehicle tire. The system comprises a centrally arranged interferometric measuring head 2, which is turned relative to the test object 1, so that the inside of the test object 1 can be tested sector-by-sector. For a 100% inspection, the sector size is selected such that the images of the individual sectors taken with the camera 3 for the interferometer 2, e.g. the sectors 1 and 2, overlap sufficiently. The interferometric measurement is then carried out for each sector. In between, the interferometer 2 and the contour detection system 10 are rotated further around the axis 8 from one sector to the next by means of a motor-driven rotating device 9. For this, the devices 5, 6 as well as the camera 4, which together form the contour detection system 10, and the interferometer 2 are rigidly connected via the fastening device 7 and are rotated jointly, relative to the test object, with the device 9. Of course, in principle it does not matter for the structural design of the testing machine whether the measuring head or the test object is positioned so as to rotate.

Separate optical devices 5 and 6 for generating respectively one light section plane L1 or L2 are installed to the left and right of the interferometric measuring head 2. The individual devices 5 and 6 can consist, for example, of separate laser diode modules with line optics. The illustrated arrangement of the light section planes L1 and L2 relative to the optical axis A of camera 4 always ensures that respectively only one light section is imaged in the left picture half and one light section in the right picture half of camera 4. Thus, the two light sections P11 and P21, which form the intersecting lines for the light section planes L1 or L2 and the surface of the test object 1, can always be identified clearly in the camera images, even if they are simultaneously detected by the camera 4 and/or are imaged by a shearing module. Light sections P 11, P12, etc., are generated, for example, by projected fringe patterns with the aid of a method disclosed in German Patent No. 19738179C1, issued May 12, 1999.

The devices 5 and 6 for generating the light section planes L1 or L2 are advantageously switched off during the interferometric measurement, so as not to interfere with the measurement. The light section planes would otherwise function as interference light. Following completion of the interferometric measurement, the light section planes are switched on and the complete measuring head is turned with the rotational device 9 around the axis 8 and on to the following section. The camera 4, which is preferably identical to the camera 3 of the interferometer 2, then observes the lines P11 and P21 that are visible on the object 1. If the camera 3 of the interferometer 2 is calibrated, then a point of the light section P11 can be projected via the observation ray B1 to an image point on the camera 3, meaning the spatial coordinates of light sections can be assigned to image coordinates of the interferometrically measured deformation data.

Figure 2:
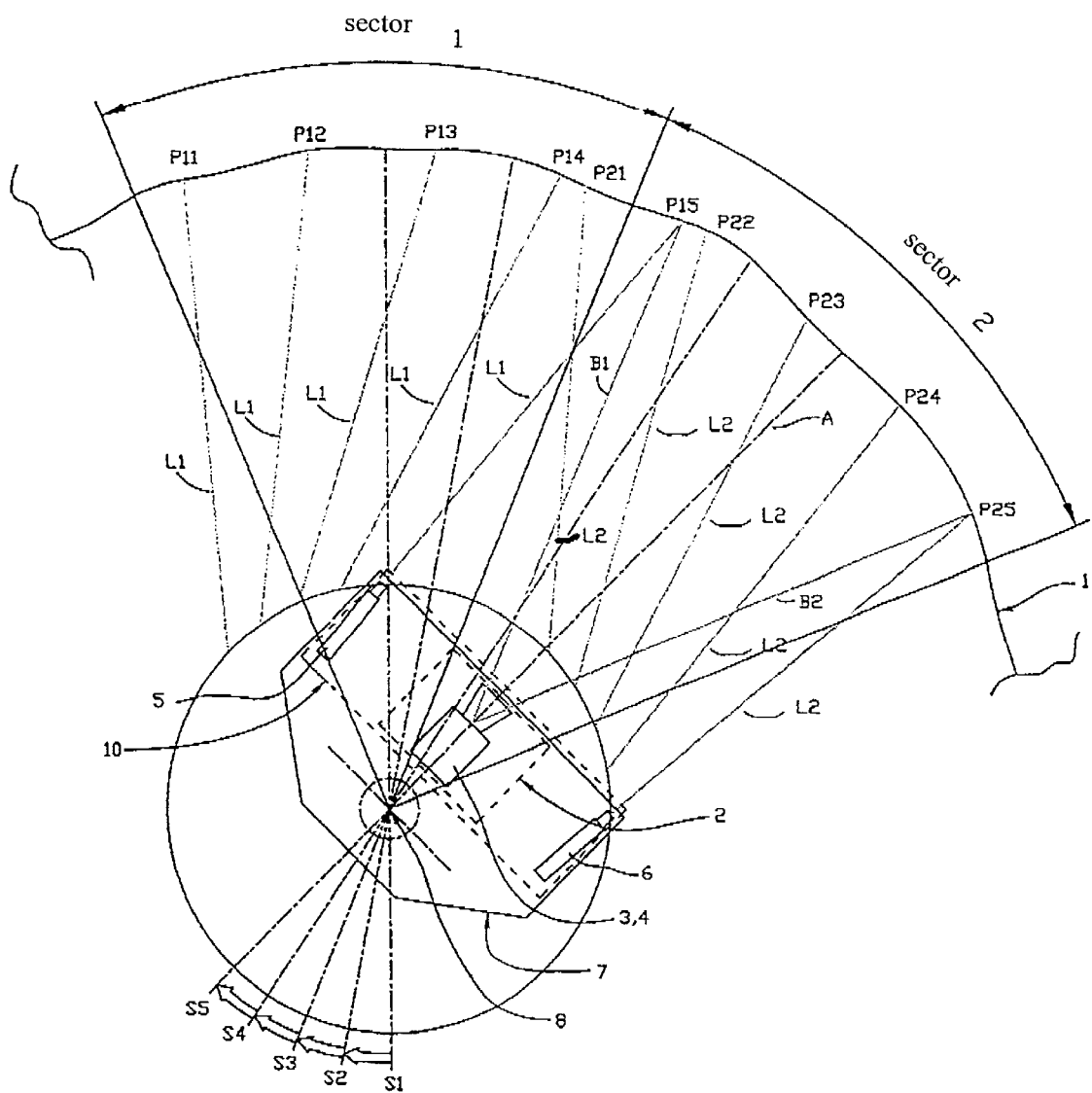
FIG. 2 is a representation of a contour measuring operation while the measuring head is being moved.

FIG. 2 shows the progression of the contour measuring operation while the measuring head is turned from the position S1 to the position S5. The camera 4 continuously photographs the images and stores these. In addition, the measuring head position is determined for each of the images stored for the light section planes L1 and L2. Thus, an image is photographed at the start of the rotational movement at position S1, images are photographed during the rotational movement at positions S2 to S4 and another image is photographed at the end of the rotational movement at position S5. The surface of sectors 1 and 2 is detected and measured in this way with a total of 10 light sections. The following table shows the light sections photographed at each of the 5 different positions:

| Position | detected light sections |
|---|---|
| S1 | P11, P21 |
| S2 | P12, P22 |
| S3 | P13, P23 |
| S4 | P14, P24 |
| S5 | P15, P25 |

At the end of the rotational movement for the measuring head, the surface geometry of sectors 1 and 2 can then be computed with a good resolution with the aid of a triangulation computation. For this, all light sections can be displayed in a joint coordinate system via the known measuring head positions S1 to S5.

As a result of the rotational movement from S1 to S5, the interferometer moves from the sector 1 to the sector 2. An interferometer measurement is thus realized in the position S1 for detecting the sector 1 and, following the completion of the rotational movement, in the position S5 for detecting the sector 2.

Figure 3A:
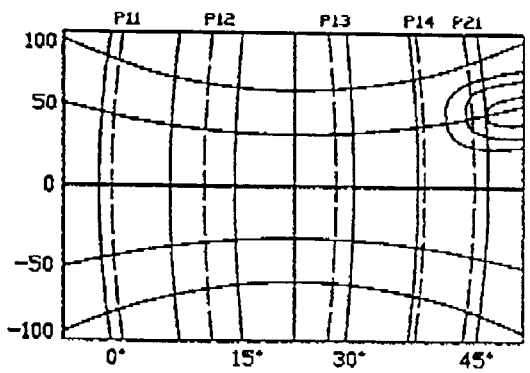
FIG. 3a is a representation of a $1^{St}$ section of an interferometric measuring result.
Figure 3B:
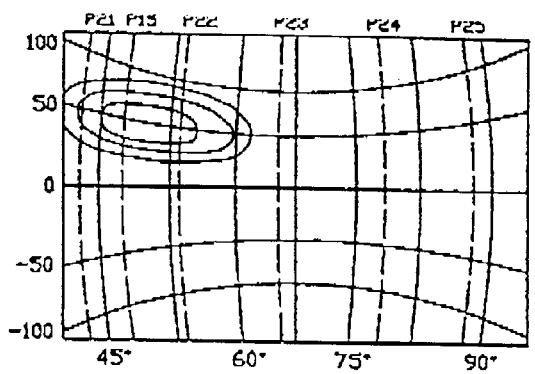
FIG. 3b is a representation of a $2^{nd}$ section of an interferometric measuring result.
Figure 3C:
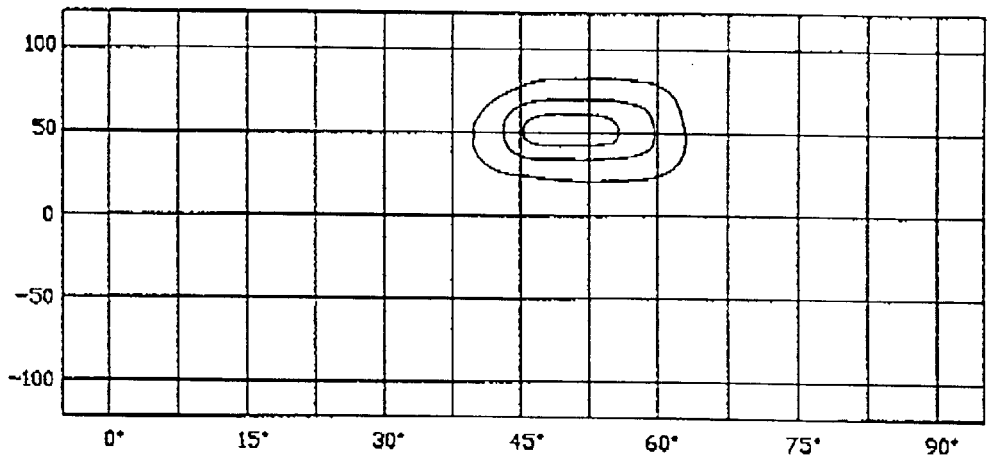
FIG. 3c is a transfer of the interferometric measuring results from FIG. 3a and FIG. 3b to a joint coordinate system.

FIGS. 3a to 3c schematically show how the obtained contour data are then used to display the interferometrically measured deformation data for sector 1 and sector 2 of FIG. 2 in a joint coordinate system. The interferometrically measured data from the sectors 1 and 2 are initially available as image data, e.g. in the form of phase images. The result images shown in FIGS 3a and 3b initially show a geometric distortion. This distortion is caused by the curvature of the object surface, as well as the distortion errors of the imaging optics. The coordinates for the light sections are subsequently used to assign the respective spatial coordinates to the image points on the interferometrically obtained deformation images. The measured light section coordinates in this case can be projected via the known geometric data from the camera 3 onto the result images, so that coordinates initially exist for those image points, which are positioned on one of the light sections P11 to P25. For the orientation, the position of light sections P11 to P25 is plotted in FIGS. 3a and 3b. The coordinates for the surrounding values or image points are computed through interpolation. By means of a coordinate transformation, the deformation data finally can be displayed in a joint coordinate system, as shown with example in FIG. 3c. The true size and shape of the defect, positioned in the overlapping region of sectors 1 and 2, now becomes visible in the joint coordinate system.

Figure 4:
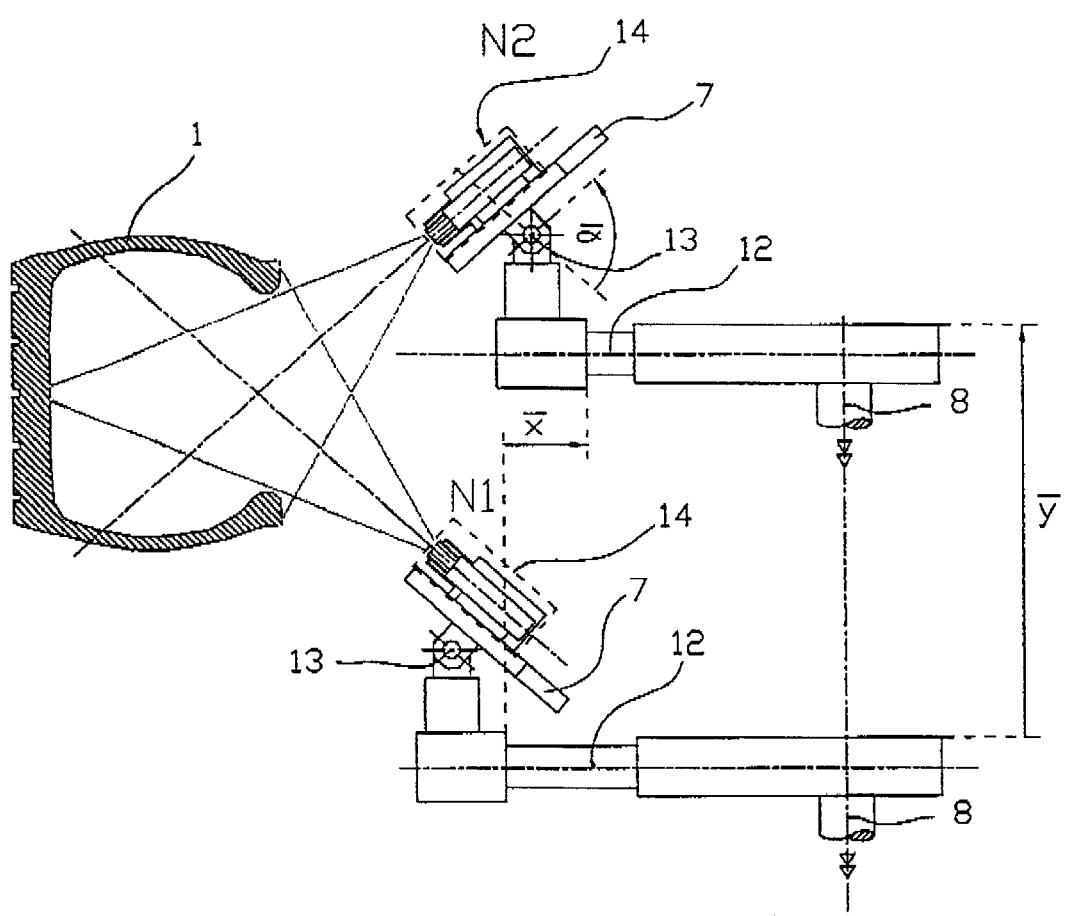
FIG. 4 shows the use of the new method with the example of a vehicle tire.
Figure 5:
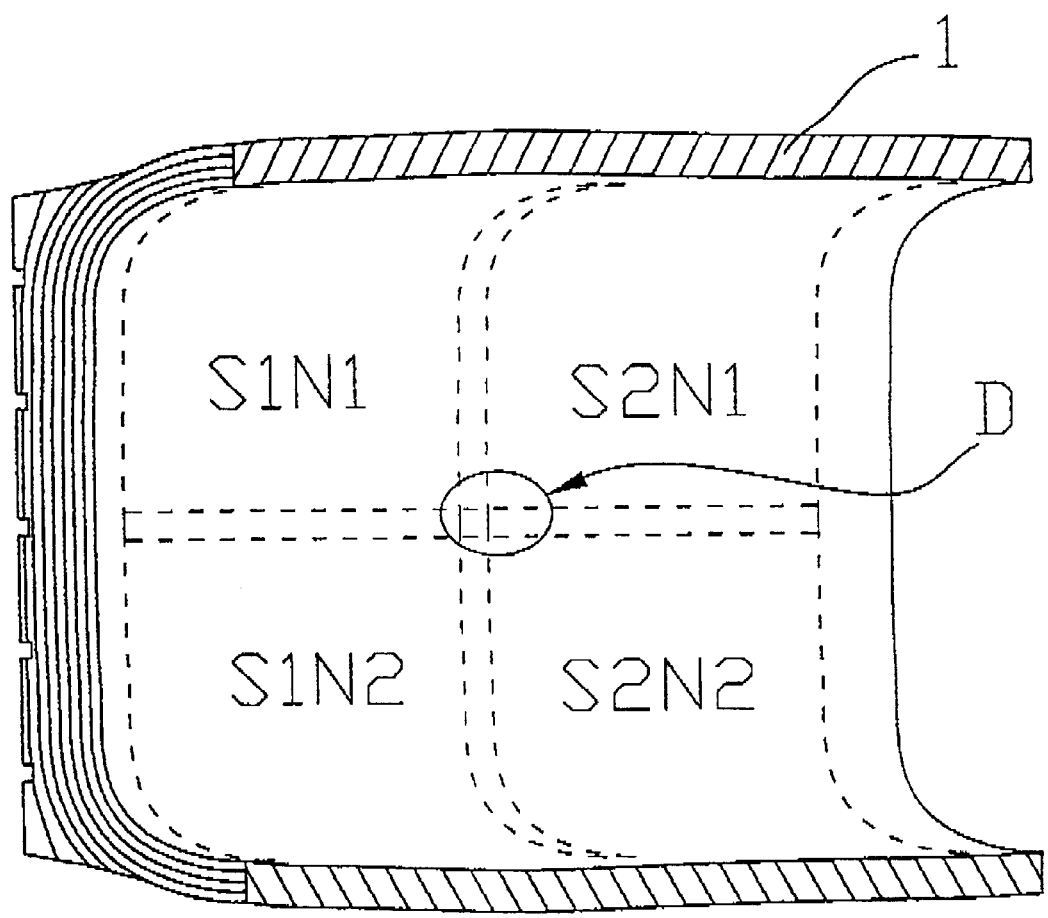
FIG. 5 shows the position of the individual measured surface sections on the vehicle tire shown in FIG. 4.
Figure 6:
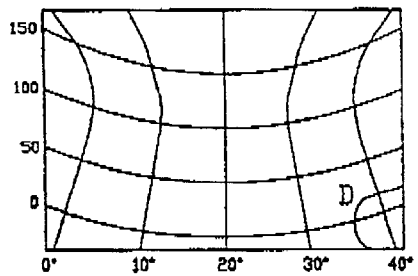
FIG. 6 shows the transfer of the measuring results of the surface sections shown in FIG. 5 to a joint coordinate system.
Figure 6:
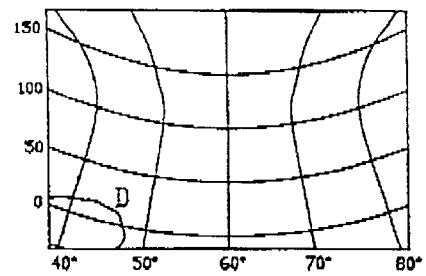
Figure 6:
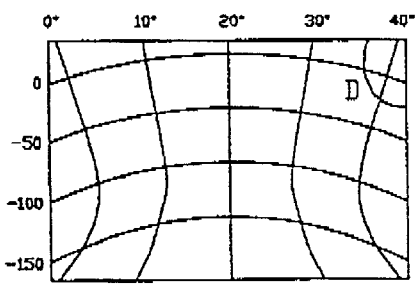
Figure 6:
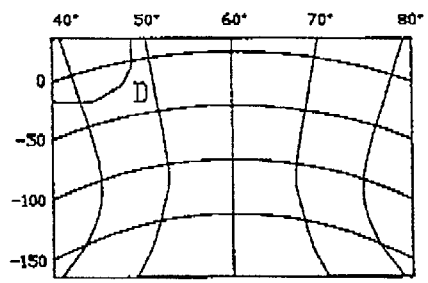
Figure 6:
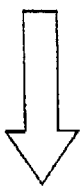
Figure 6:
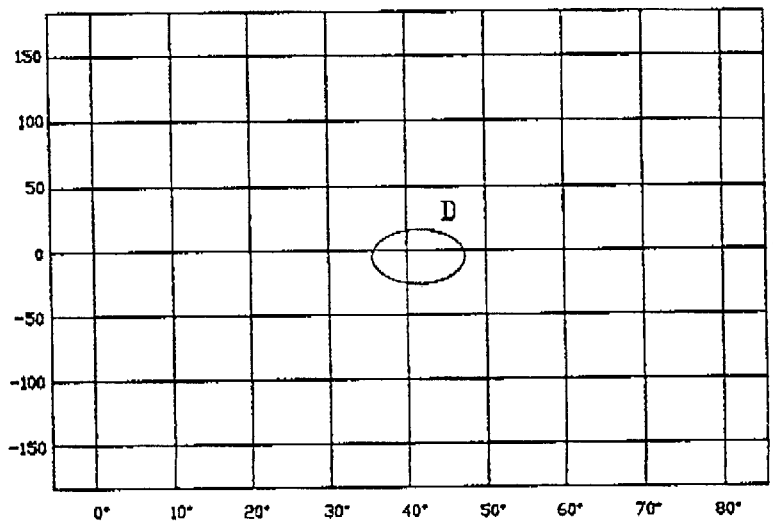

FIGS. 4 to 6 show the practical application of the new method with the example of a vehicle tire. The inside of the tire is interferometrically measured to determine the inner structural defects, as is frequently standard practice.

FIG. 4 shows the positioning of measuring head 14 relative to the cross section of the tire 1. The measuring head 14 corresponds to the measuring system shown in FIGS. 1a and 1b and consists of a light section sensor for determining the object contour, as well as an interferometric measuring head for the interferometric measuring of the area of deformation. Light section sensor and interferometric measuring head are again rigidly connected to each other via the fastening device 7. As compared to FIGS. 1a and 1b, however, the measuring head 14 not only is positioned such that it can rotate around the axis 8, but such that it can also be displaced in the direction of axis 8, can rotate around the axis 13 and can be displaced in the direction of axis 12. The measuring head 14 can be positioned optimally, relative to the tire 1, by expanding the mobility of the measuring system by these three degrees of freedom. The inside of tire 1 thus can be detected completely with respect to the tire cross section, in that the measuring head 14 takes one measurement at the position N1 and one measurement at the position N2. In order to test the tire along the complete circumference, the measuring head 14 is turned around the rotational axis 8 and the tire is tested section-by-section. During the measuring head 14 movement from one section to the next, the inside contour of the tire is detected as shown in FIG. 2. To determine the spatial assignment of data from position N1 to data from position N2, the defined displacements of the measuring head 14 are used, which are carried out to move the measuring head 14 from position N1 to position N2. This represents a combination of a displacement $\vec{y}$ in the direction of axis 8, a displacement $\vec{x}$ in the direction of axis 12 and a rotational movement $\vec{\alpha}$ around the axis 13. In order to minimize the number of movements for the measuring head 14, it is advantageous if the tire is initially tested section-by-section along the circumference of the tire with the position N1. Subsequently, the measuring head is moved to position N2 and the complete circumference of tire 1 is again tested section-by-section.

FIG. 5 shows the position of the individual interferometrically tested surface sections of the first two sectors on the tire 1 if the above testing method is used. For all other sectors, the same exact conditions apply because of the rotational symmetry of the test object. For a testing that covers the complete surface, the individual surface sections S1N1, S2N1, S1N2, S2N2 overlap in horizontal as well as in vertical direction. A defect D is located in the overlapping region for sections S1N1, S2N1, S1N2 and S2N2. However, the defect D location is not detected completely with any one of the sections S1N1, S2N1, S1N2 and S2N2.

FIG. 6 shows the transfer of sections S1N1, S2N1, S1N2 and S2N2 to a joint coordinate system. The geometric tire data that is determined during the testing is used for this. With the procedural steps used herein for the section-by-section interferometric testing of the tires, the results not only must be lined up sector-by-sector, but the results from the upper and lower half of the tire must also be joined. As compared to the example in FIG. 2, however, this does not represent a principal difference, but only results in additional computations. Since the tire is a rotation-symmetrical body, the coordinates in circumferential direction of the tire are provided in angular degrees. The coordinates perpendicular to the circumferential direction of the tire, on the other hand, are provided as unwound length, which is measured starting from the tire center. The defect D can be seen only in part in the individual measuring sections S1N1, S2N1, S1N2 and S2N2. Its true shape and size can only be seen in the representation of the individual measuring sections in a joint coordinate system (S1N1+S2N1+S1N2+S2N2).

What is claimed is:

1. A method for testing the deformation of test objects with diffuse scattering surface that are subjected to different stresses, for which method
    the object surface is tested section-by-section with an interferometric measuring head with camera that uses an interferometric technique for measuring an area,
    the areas of displacement or expansion on the object surface, caused by different stresses, are detected in the test object images on the image sensor of the camera,
    the images created on the image sensor are fed to an image processing system for the further processing,
    the displacement or the stress/expansion condition of the test object is computed from the generated images by the image processing system,
    wherein
    the optical ray path of the camera for the interferometric measuring head is determined through a calibration,
    the camera for the interferometric measuring head is moved with a defined relative movement to the test object from one section of the object surface to the next,
    light sections are generated on the interferometrically measured sections of the test object surface,
    the generated light sections on the object surface are detected with the aid of a camera,
    the spatial coordinates of the light sections are computed with a triangulation computation,
    the spatial coordinates of the surface sections are determined from the spatial coordinates of the light sections,
    and the appropriate spatial coordinates are assigned to the interferometrically detected deformation data with the aid of the obtained spatial coordinates for the surface sections and the data for the relative movements performed by the interferometric measuring head.

2. A method according to claim 1, wherein the spatial coordinates for the object surface are detected section-by-section with the light-section contour detection system.

3. A method according to claim 2, wherein the interferometric measuring head and the light section contour detection system are rigidly connected and jointly perform the relative movements from one section of the object surface to the next section.

4. A method according to claim 3, wherein the camera for the interferometric measuring head is used to photograph the generated light sections.

5. A method according to claim 1, wherein light section planes are generated and are used to project the light sections onto the object surface.

6. A method according to claim 1, wherein the light sections are generated by means of projected fringe patterns.

7. A method according to claim 6, wherein the object contour is measured section-by-section and that the contour and the deformation are measured at precisely the same positions of the measuring system.

8. A method according to claim 2, wherein few individual light sections are generated and the spatial coordinates for the object surface are determined from these light sections.

9. A method according to claim 8, wherein the generated light sections are photographed with a camera during the relative movement between the light-section contour detection system and the test object and, subsequently, are processed further in an image-processing system.

10. A method according to claim 2, wherein each momentary position of the light-section contour detection system, which exists for each photographed image of the generated light sections, is determined relative to the object and that the light section coordinates determined from this are transferred to a joint coordinate system.

11. A method according to claim 1, wherein the direction for moving the interferometric measuring head and/or the light-section contour detection system, relative to the test object, is used for calibrating the respective measuring system.

12. A method according to claim 1, wherein the light sources for generating the light sections are switched off during the interferometric measuring operation.

13. A method according to claim 1, wherein spatial coordinates that are necessary, but are not measured, are computed through interpolation from known spatial coordinates of neighboring points.

14. A method according to claim 1, wherein deformation values, which are necessary but are not measured, are computed through interpolation from known deformation values of neighboring points.

15. A method according to claim 14, wherein in order to compute the deformation values from phase images by means of interpolation, the areas of discontinuity in the phase images are removed through a sine and cosine transformation, that the interpolation is realized in the sine and cosine transformation and that subsequently, the phase values are computed from the obtained interpolated sine and cosine values.

16. A method according to claim 1, wherein a joint coordinate system is used to display the deformation measuring results for the individual object surface sections.

17. A method according to claim 1, wherein the object surface is developed by calculation for displaying the results of the deformation measurements on the object surface.

18. A method according to claim 1, wherein data obtained by means of the light-section contour detection system are used for positioning the interferometric measuring head relative to the test object.

19. An apparatus for testing objects (1) with diffuse scattering surface, consisting of an interferometric measuring head (2) with a camera (3) for photographing image data, an image processing system (11) that is connected to the camera (3) and is used to further process the images generated by the camera (3), wherein the test system is provided with at least one device (9) for realizing defined relative movements between the interferometric test head (2) and the object surface (1), the test system is provided with a light-section contour detection system (10), comprising at least one device (5, 6) for generating light surfaces (L1, L2), which are oriented toward the camera (4) in such a way that the light sections (P11, P21) created by this device (5, 6) can be observed with the camera (4) on the test object (1), means for determining the spatial coordinates of the light sections, and, means for determining from this the spatial coordinates for the object surface sections, means for assigning appropriate spatial coordinates to the interferometrically detected deformation data.

20. An apparatus according to claim 19, wherein the interferometric measuring head (2), the devices (5, 6) for generating light surfaces (L1, L2) and the cameras (3) and (4) are rigidly connected to each other via a fastening device (7) and can be moved jointly, relative to the test object (1), by means of a device (9).

21. An apparatus according to claim 20, wherein the camera (3) of the interferometric measuring head (2) and the camera (4) of the light-section contour detection system (10) are one and the same camera.

22. An apparatus according to claim 20, wherein the camera (3) for the interferometric measuring head (2) and the camera (4) of the light-section contour detection system (10) are arranged side-by-side or one above the other.

23. An apparatus according to claim 19, wherein the devices (5, 6) for generating light surfaces are designed such that the generated light surfaces (L1, L2) respectively are level planes.

24. An apparatus according to claim 19, wherein the device for generating light surfaces (L1, L2) is a fringe projector.

25. An apparatus according to claim 24, wherein the cameras (3) and (4) are one and the same camera, that the imaging optics of the camera comprises a shearing module and that the shearing direction of the shearing module and lines of the projection grid for the fringe projector are aligned parallel to each other.

26. An apparatus according to claim 19, wherein the device for generating light surfaces consists of one or more optical devices (5, 6), which generate individual light surfaces (L1, L2).

27. An apparatus according to claim 26, wherein the cameras (3) and (4) are one and the same camera and that the imaging optics for the camera contains a shearing module.

28. An apparatus according to claim 26, wherein the device (9) for the joint, defined movement of the interferometric measuring head (2) and the light-section contour detection system (10), relative to the test object (1), is designed such that the momentary position of the light-section contour detection system (10) relative to the test object can be determined during the movement.

29. An apparatus according to claim 26, wherein the camera (4) of the light-section contour detection system (10) is equipped with a mechanical or an electronic shutter.

30. An apparatus according to claim 19, wherein device (9) for the defined movement of the interferometric measuring head (2) and/or the light-section contour detection system (10), relative to the test object, consists of one or several stepping motors.

31. An apparatus according to claim 19, wherein the devices (5, 6) for generating the light surfaces (L1, L2) are provided with a switch for switching on or switching off the light sources for the devices (5, 6).

32. An apparatus according to claim 19, wherein one or more laser scanners are used as devices (5, 6) for generating the light surfaces.

33. An apparatus according to claim 19, wherein the camera (3) as well as the camera (4) are connected to the image processing system (11).

* * * * *